GEORGE E. SMITH.
Improvement in Lubricators for Machinery.
No. 115,247. Patented May 23, 1871.
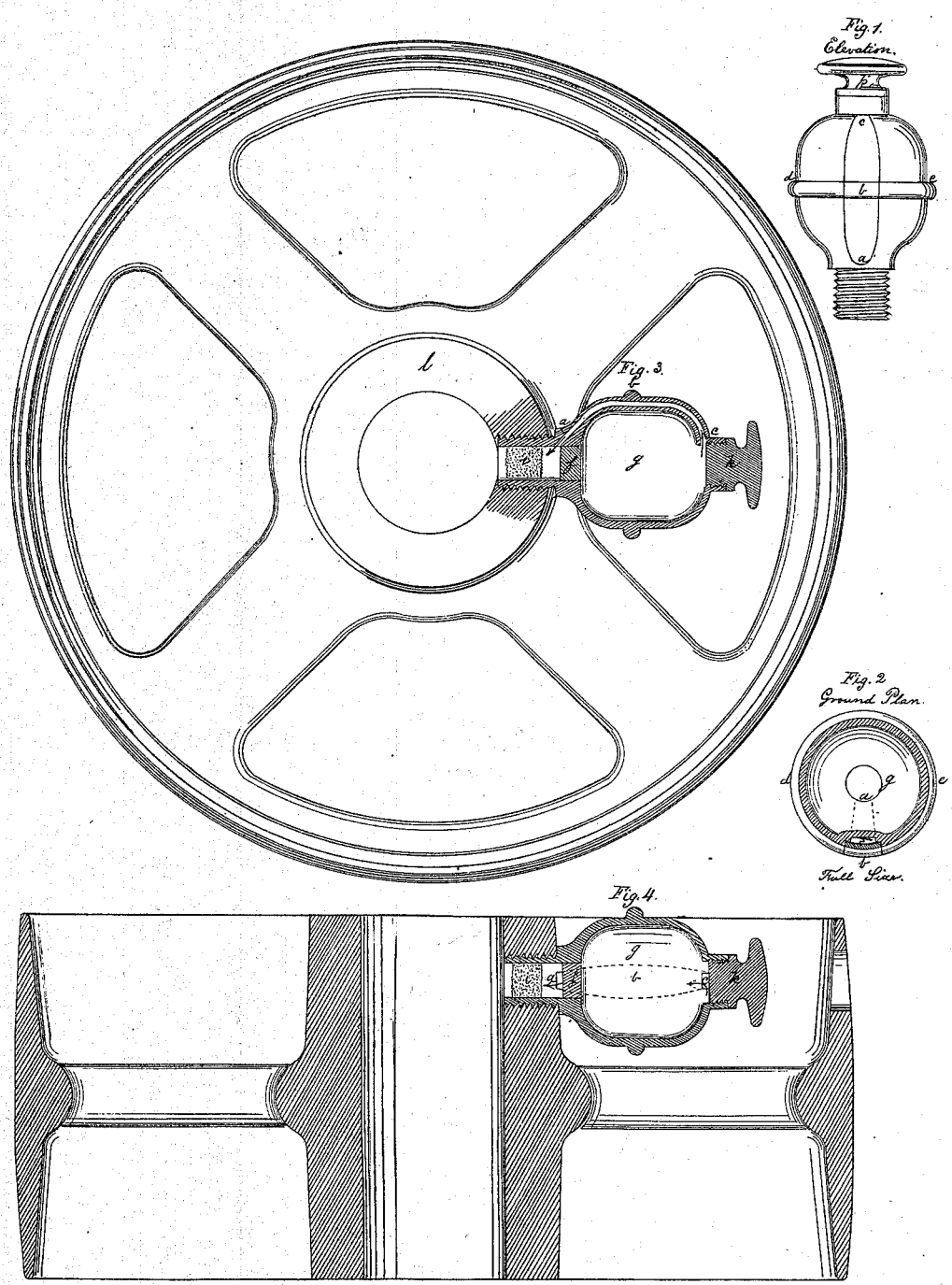

UNITED STATES PATENT OFFICE.

GEORGE E. SMITH, OF FITCHBURG, MASSACHUSETTS.

IMPROVEMENT IN LUBRICATORS FOR MACHINERY.

Specification forming part of Letters Patent No. 115,247, dated May 23, 1871.

*To all whom it may concern:*

Be it known that I, GEORGE E. SMITH, of Fitchburg, in the county of Worcester and State of Massachusetts, have invented certain Improvements in Oil-Cups or Lubricators, of which the following is a specification.

This invention relates to that class of devices known as "lubricators for machinery;" and it consists in providing the oil-reservoir with a tube or passage extending from or about the top of the same, and communicating with the shank of the oil-cup, by which means lubricating-fluid is supplied to the journal or bearings of pulleys and other desired devices.

Figure 1 is a side elevation of the oil-cup or lubricator of my invention. Fig. 2 is a horizontal section at the greatest diameter of the oil-cup. Fig. 3 is a longitudinal section at right angles with the shaft upon which the pulley revolves, showing the internal construction and position of the oil-cup when in use. Fig. 4 is a longitudinal section at right angles with the section represented in Fig. 3.

The oil-cup is made of brass or other metal, of spherical or elliptical form, having an oil-chamber, $g$, and small tube or passage $h$, leading from oil-chamber at $c$, and passing near the circumference of the oil-cup, and communicating with the space in the neck of the oil-cup at $a$. This space leads to the shaft or bearing upon which the pulley or other machinery revolves. In this space there is fitted a piece of sponge, $i$, or other porous substance. By increasing or diminishing the size or degree of porosity of this substance the flow of the oil may be regulated as desired. The cap $k$ is screwed tightly to its place, closing the opening through which the oil-cup is filled. These oil-cups can be cast with the chamber $g$ and curved groove $h$. To facilitate in manufacturing, they may be cast hollow through the entire length, and communication stopped between the oil-chamber and space in the neck of the oil-cup with a wooden plug, $f$, or other material. A piece of metal, $a\,b\,c$, may be soldered or otherwise fastened in the groove, so as to form the passage or tube $h$, and the outer surface made smooth by turning or otherwise; or the connection between chamber $g$ and space in the neck of the oil-cup may be made by a curved tube.

When in use, the oil-cup is screwed tightly to the hub of the pulley $l$ or other machinery to be oiled, its position being shown in Fig. 3, the arrows indicating the direction the pulley revolves and the course the oil takes to go from oil-chamber $g$ to the shaft or bearing to be oiled, the centrifugal force having the tendency to throw the oil to the outside of the oil-chamber, and the revolution of the pulley causes the oil to pass through the passage $h$ and porous substance $i$, where its quantity is regulated. The oil-cup should be placed in the pulley, so that the oil will flow in a direction opposite to the revolution of the pulley.

I claim—

1. The tube or passage $h$, leading from or about the top of the oil-cup, and communicating with the space in the neck or shank of the same, arranged and operating substantially as described.

2. The oil-cup provided with the longitudinal passage $h$, with its two openings, as described, in combination with the porous substance $i$, when the same are constructed and arranged to operate together as and for the purpose set forth.

GEORGE E. SMITH.

Witnesses:
NATHL. WOOD,
E. P. DOWNE.